Jan. 29, 1929.
D. W. SUTHERLAND, JR
1,700,655
ACIDITY TESTING MACHINE
Filed June 9, 1924 2 Sheets-Sheet 1
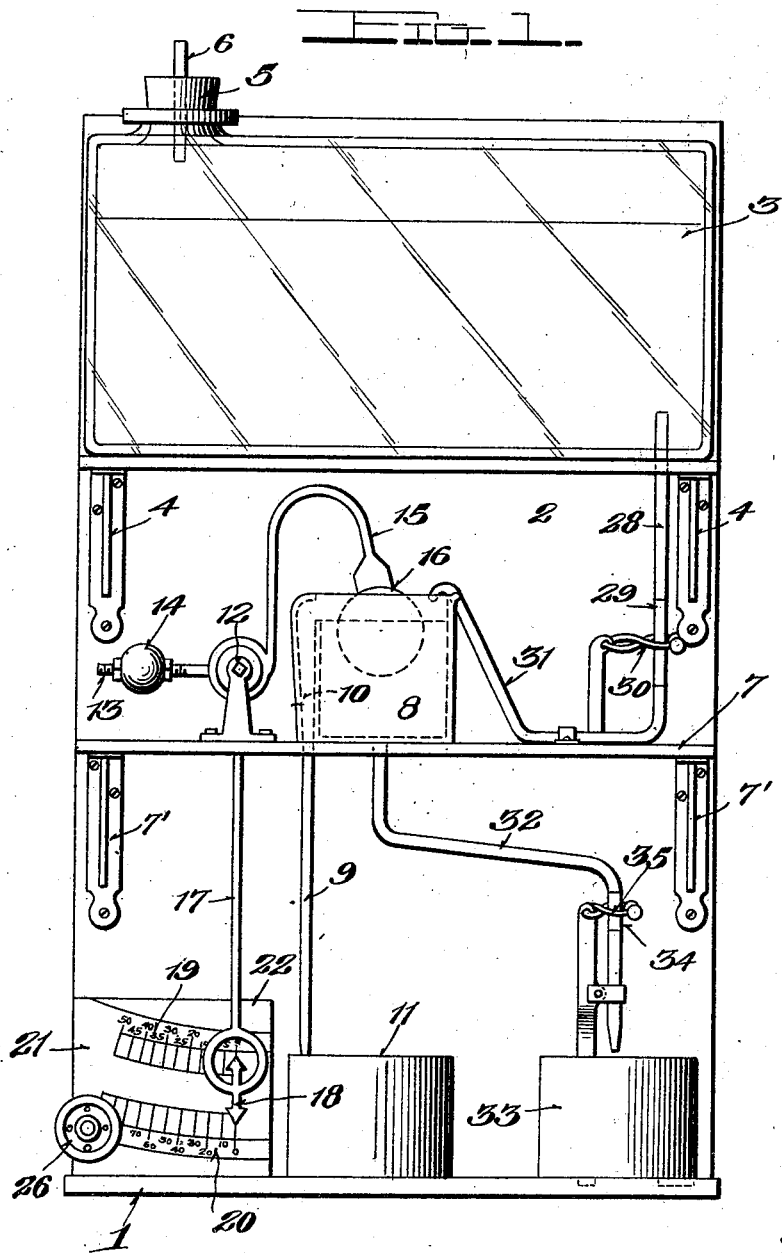
Inventor
Donald W. Sutherland Jr.
By A. W. Freeman
Attorney Jan. 29, 1929.
D. W. SUTHERLAND, JR
1,700,655
ACIDITY TESTING MACHINE
Filed June 9, 1924
2 Sheets-Sheet 2
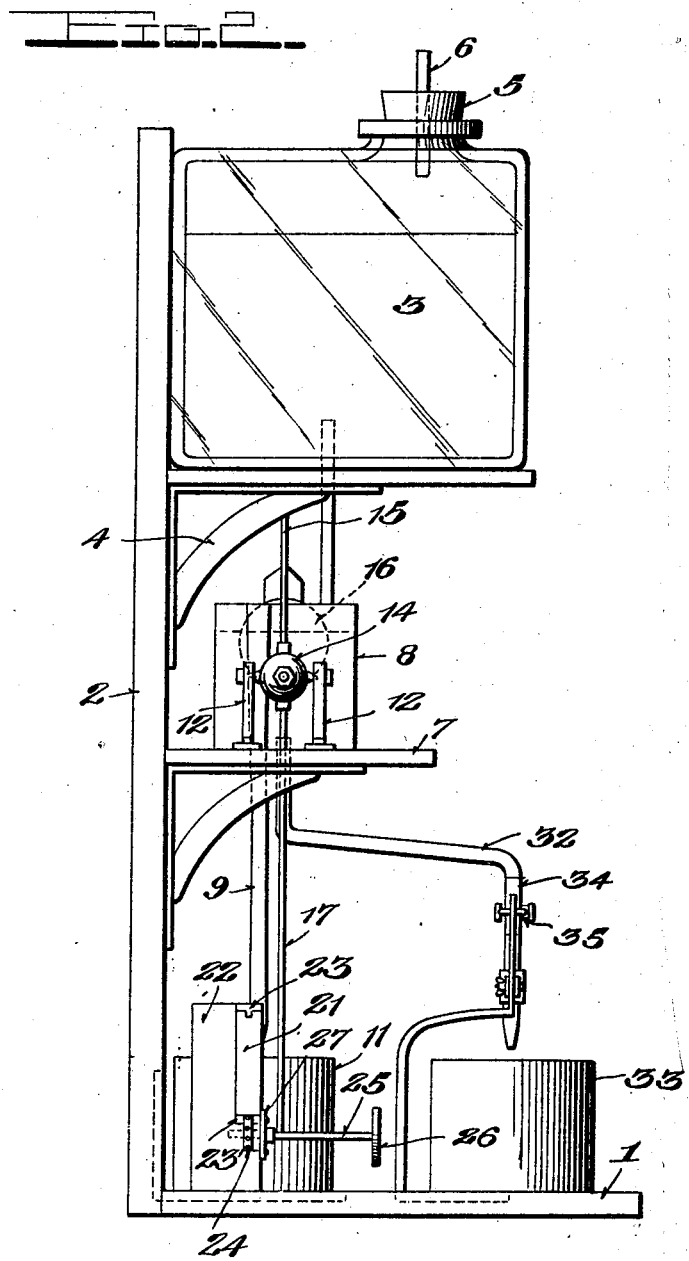

Patented Jan. 29, 1929.

1,700,655

UNITED STATES PATENT OFFICE.

DONALD W. SUTHERLAND, JR., OF SIOUX FALLS, SOUTH DAKOTA.

ACIDITY-TESTING MACHINE.

Application filed June 9, 1924. Serial No. 718,809.

This invention relates to certain new and useful improvements in acidity test machines and pertains more especially to a machine for testing the acidity of cream and milk.

The primary object of the invention is to provide a machine of this character which embodies improved means for enabling the test to be easily and quickly performed: to provide novel means for automatically and initially setting the pointer at zero; and to also provide means for correcting the setting of the scale relative to the pointer.

A further object of the invention is to provide novel means for draining the neutralizer from measuring or testing receptacle into the milk or cream container and for compactly relating all of the parts so as to bring all of said parts in a relatively small area readily accessible for operation.

The invention has still further and other objects which will be later herein set forth and of themselves manifested in the course of the following description.

In the drawings:

Figure 1, is a side elevation of the invention, and

Figure 2, is a front elevation of the invention.

In proceeding in accordance with the present invention, the base 1 is employed having a vertical back 2, the latter carrying a neutralizer supply tank or reservoir 3 supported on brackets 4, the tank 3 being preferably formed of glass and having an inlet controlled by a closure 5 equipped with an air inlet tube 6. A shelf 7 is secured to the back 2 by brackets 7', and is located below the tank 3 and above the base 1, and supports a measuring receptacle or cup 8 thereon. A vertical pipe 9 has its upper end extending through the shelf 7 and communicates with an overflow passage 10 formed in the cup 8. The lower end of the pipe 9 discharges into a collecting receptacle 11 mounted on the base.

A lever is pivoted to a bracket 12 secured to the shelf 7 and has a threaded horizontal arm 13 along which a weight 14 is adjustable, and an upwardly extending and downwardly curved arm 15, the lower end of which carries a float 16 that is disposed within the cup 8. A depending pointer arm 17 is carried by the lever in alinement with the pivot thereof and carries a double ended pointer 18 on its lower end.

The pointer 18 cooperates with upper and lower scales 19 and 20 on a slidable plate 21 mounted on a support 22, the latter having a tenon 23 engaged in a groove in the top edge of the plate 21, while the lower edge of the plate slides on a ledge 23' in the support and is formed with a row of holes in which are received the pin teeth of a cog wheel 24. The cog wheel is fixed on a shaft 25 having a knob 26 thereon, and is journaled in a bearing 27 secured to the front face of the support 22. By turning the knob, the plate 21 may be slid in its ways and thus positioned to bring its zero mark in register with the pointer 18, in any position of the weight 14.

A pipe 28 leads downwardly from the tank 3 and has a rubber section 29 which may be collapsed to cut-off the flow of liquid therethrough by means of a pinch cock 30, the rubber section 29 being connected to a second pipe 31, which latter discharges into the upper end of the cup 8.

A pipe 32 leads downwardly from the cup 8 and discharges into a cup 33. A rubber section 34 is inserted in the pipe 32 and is controlled by a pinch cock 35 similar to the pinch cock 30. The pipes and various tanks or the like may be constructed of glass, or other material, and in the instance of the tanks, etc., porcelain may be used.

In operation, the correct amount of milk or cream is measured and placed in the cup 33, in the instance of milk 17.6 cc. is used and in the instance of sour cream 9 cc. A few drops of the indicator, i. e. 10% solution of phenolphthalein in ethyl alcohol, is next added. The pointer being set at zero, the cup 33 is now placed beneath the discharge end of pipe 32, the cock 35 released, and the neutralizer from tank 3 permitted to run into the cup until the "end point" is reached as indicated by a faint pink coloring of the mixture. The acidity is read from the scale, thus if 17.6 cc. has been used the reading is from the top scale and if 9 cc. has been used, the reading is from the bottom scale.

To return the pointer to zero, the cock 30 is released, which allows the solution from tank 3 to run into cup 8, whereupon the pointer will swing to the right, and when it reaches zero, the cock 30 is closed. If an excess of neutralizer has been admitted to cup 8 in returning the pointer to zero, the overflow pipe 9 will automatically discharge same and return the pointer to zero. If the weight is moved in the balance side of the float then the scale may be moved by the knob 26 to register its zero mark with the pointer.

For as much of the neutralizer as is withdrawn from the cup 8 to neutralize the acid in the milk, the float 16 will correspondingly drop and thereby effect movement of the pointer 18 over the dials 19 and 20 from which the readings may be read in terms of acidity. The addition of the indicator to the milk is merely to provide a means for attracting the eye of the observer when the point of neutralization has been attained. The indicator, as above set forth by way of an example, will lend a pink color to the mixture when the acid in the milk has become neutralized.

What is claimed is:

In an apparatus for indicating the amount of liquid withdrawn from a vessel, having a frame with a base, a shelf above the base, a vessel on the shelf, and a vessel on the base having a conduit leading thereto from the vessel on the shelf, an arm having a portion provided with an adjustable weight on its outer end, and having a portion extending over the vessel on the shelf and the end of which latter is provided with a float received in said vessel on the shelf, means to pivot the arm to the shelf, a vertically disposed arm connected to the first named arm and extending below said shelf, a pointer on the lower end of the said vertically disposed arm, and a scale on the frame below said shelf and adjacent to the vessel on the base and over which the pointer is movable to indicate the amount of liquid withdrawn from the vessel on the shelf.

In testimony whereof I affix my signature.

DONALD W. SUTHERLAND, Jr.